March 1, 1949.　　　　L. F. GADBOIS　　　　2,463,373
FRICTION SHOCK ABSORBING MECHANISM
FOR RAILWAY DRAFT RIGGINGS
Filed Nov. 29, 1946　　　　　　　　　　2 Sheets-Sheet 1
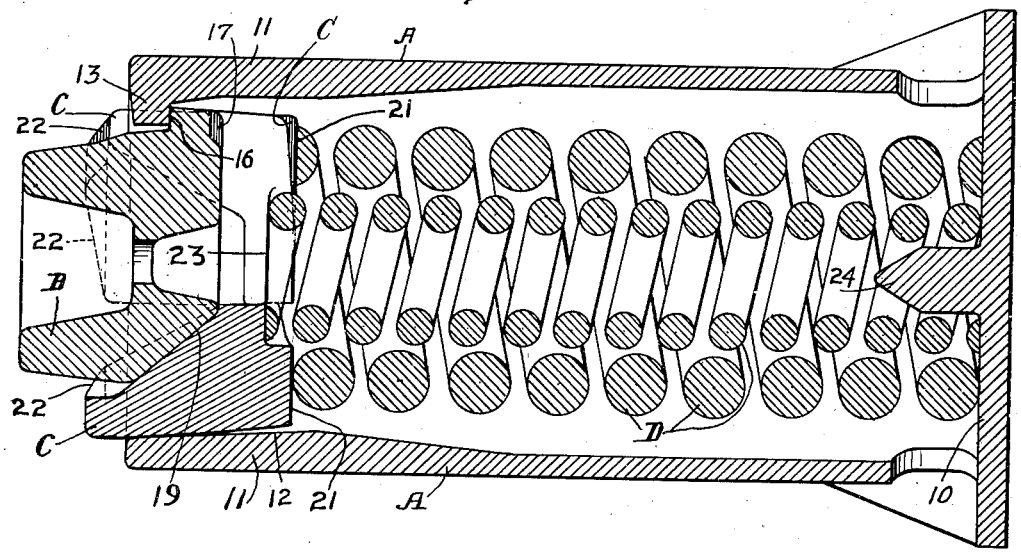
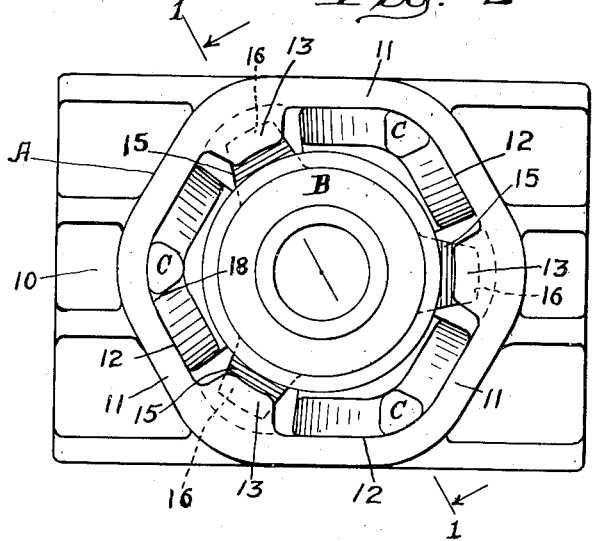
Inventor:
Lewis F. Gadbois.
By Henry Fuchs.
Atty.

March 1, 1949.   L. F. GADBOIS   2,463,373
FRICTION SHOCK ABSORBING MECHANISM
FOR RAILWAY DRAFT RIGGINGS
Filed Nov. 29, 1946

Inventor:
Lewis F. Gadbois.
By Henry Fuchs
Atty.

Patented Mar. 1, 1949

2,463,373

UNITED STATES PATENT OFFICE 2,463,373

FRICTION SHOCK ABSORBING MECHANISM FOR RAILWAY DRAFT RIGGINGS

Lewis F. Gadbois, Kenmore, N. Y., assignor to W. H. Miner, Inc., Chicago, Ill., a corporation of Delaware Application November 29, 1946, Serial No. 712,829

7 Claims. (Cl. 213—34)

1

This invention relates to improvements in friction shock absorbing mechanisms for railway draft riggings.

One object of the invention is to provide a friction shock absorbing mechanism, especially adapted for railway draft riggings, comprising a friction casing and a spring resisted friction clutch slidingly telescoped within the casing including friction shoes and a wedge block having lugs engageable in back of stop lugs on the casing to limit outward movement of the wedge block and hold the mechanism assembled, the wedge block in being assembled with the casing being brought into position to engage in back of the lugs of the casing by turning the block about its axis, wherein the parts are particularly designed to facilitate easy and quick assembling of the mechanism.

A further object of the invention is to provide a mechanism as set forth in the preceding paragraph wherein the lugs on the wedge block and the outer ends of the shoes are cut away to provide beveled portions which cooperate in the operation of assembling the mechanism, thereby greatly facilitating the positioning of the wedge block with the lugs thereof properly aligned with the stop lugs of the casing.

Other objects of the invention will more clearly appear from the description and claims hereinafter following.

Figure 3:
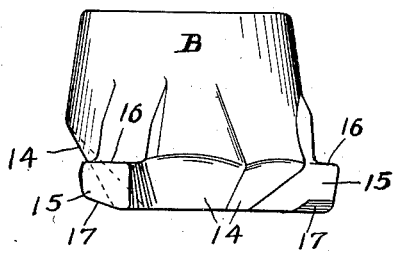
Figure 4:
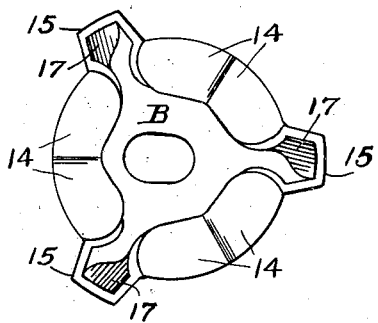
Figure 5:
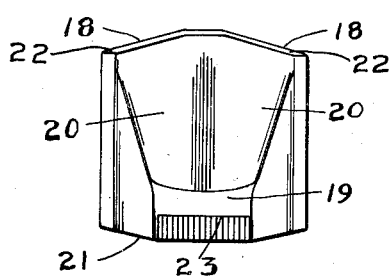
Figure 6:
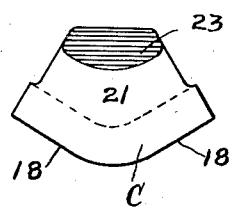
Figure 7:
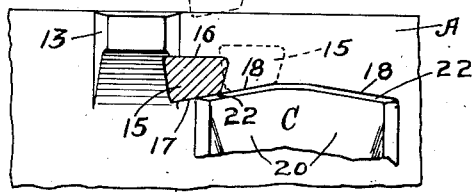

In the accompanying drawings forming a part of this specification, Figure 1 is a longitudinal sectional view through a friction shock absorbing mechanism, illustrating my improvements in connection therewith, said view corresponding substantially to the line 1—1 of Figure 2. Figure 2 is a front elevational view of Figure 1, looking toward the right in said figure. Figure 3 is a side elevational view of the wedge block of my improved mechanism. Figure 4 is a bottom plan view of Figure 3. Figure 5 is a side elevational view of one of the friction shoes of my improved mechanism. Figure 6 is a bottom plan view of Figure 5. Figure 7 is a diagrammatic view of a portion of the friction shell, a portion of one of the associated shoes, and one of the lugs of the wedge block, illustrating the manner of assembling the mechanism.

As shown in the drawings, my improved friction shock absorbing mechanism comprises broadly a friction casing A, a wedge block B, three friction shoes C—C—C, and a spring resistance D.

The casing A is in the form of a hollow, tubular member, open at its front end and closed

2 at its rear end by a transverse wall 10, which is extended laterally outwardly beyond the sides of the casing to provide a rear follower member which is integral with the casing. The casing is of hexagonal, interior and exterior, transverse cross section and the walls thereof are thickened at its open end, as indicated at 11. The thickened wall portion of the casing provides the friction shell proper of the mechanism, presenting three inwardly converging friction surfaces 12—12—12 of V-shaped, transverse cross section, each V-shaped surface 12 being formed by the interior faces of two adjacent walls of the hexagonal casing. At the open outer end, the casing A is provided with three inturned stop lugs 13—13—13, which are alternated with the three friction surfaces 12—12—12, the same being at the corners of the casing between adjacent of said V-shaped surfaces.

The wedge B is in the form of a block having a set of three wedge faces 14—14—14 at its inner end which are arranged symmetrically about the central longitudinal axis of the mechanism and converge inwardly. Each wedge face 14 is of V-shaped, transverse cross section. At its inner end, the wedge block also has three laterally, outwardly projecting, radial lugs 15—15—15, which are alternated with the wedge faces thereof, as clearly shown in Figures 2 and 4. In other words, the lugs 15 are arranged so that they are located between adjacent wedge faces and extend between adjacent shoes C—C to engage in back of the lugs 13 of the casing to restrict outward movement of the wedge block. Each lug 15 has a flat front face 16, which engages with the rear face of the corresponding lug 13 of the casing, which rear face is also flat. The rear face of each lug 15 is beveled off, as indicated at 17, the inclination of said beveled face being such that the lug tapers laterally from right to left, as seen in Figure 3.

The three friction shoes C—C—C surround the wedge block B, being interposed between the wedge faces 14 of the latter and the friction surfaces 12 of the casing. The three shoes are of similar design, each having an outer, longitudinally extending, V-shaped friction surface 18, similarly inclined to and engaged with one of the V-shaped surfaces 12 of the casing. On the inner side, each shoe is provided with an enlargement 19 having a wedge face 20 of V-shaped, transverse section engaging one of the V-shaped wedge faces 14 of the block B and correspondingly inclined thereto. The inner ends of the enlargements of the shoes present flat, transverse abutment faces 21 on which the spring resistance D bears. The forward end of each shoe is beveled off at opposite sides of its longitudinal center, as indicated at 22—22, the shoe being thus tapered in opposite lateral directions outwardly from the center thereof. The beveled surface, which is at the left hand side of the shoe, as seen in Figures 5 and 7, is provided to afford clearance for the lug 15 of the wedge block, said face being correspondingly inclined to the inner end face 17 of the lug 15. The purpose of these beveled or inclined faces is to provide clearance for the lugs 15 of the wedge block and guide the same in position in back of the cooperating lugs 13 of the casing in the operation of assembling the wedge with the casing.

The spring resistance D, which is interposed between the shoes C—C—C and the rear end wall 10 of the casing, comprises an inner light coil and a heavier outer coil. The outer coil bears at its front end directly on the flat rear faces 21—21—21 of the three shoes and the inner coil has its front end seated on depressed portions 23—23—23 of said faces. The rear ends of both coils of the spring resistance means D bear on the wall 10 of the casing, the inner coil being centered by a boss 24 extending into the same.

In assembling the mechanism, the casing A is stood in upright position, resting on its closed end. While in this position, the spring resistance D is placed within the casing. The shoes C—C—C are then assembled with the casing, being placed on top of the spring resistance D. Next, the wedge block B, positioned so that the lugs 15 thereof are offset in clockwise direction with respect to the lugs 13 of the casing, as seen in Figure 2, is entered between the shoes C—C—C, seating the lugs 15 on the lower or depressed ends of the inclined faces 22 at the corresponding sides of the shoes. This position of one of the lugs 15 of the wedge is illustrated in dotted lines in the diagrammatic view shown in Figure 7. The shoes are then forced inwardly of the casing against the resistance of the spring means D by pressure applied directly to the shoes, the wedge, which is supported on the shoes and lowered therewith, being held against rotation by any suitable means until the lugs 15 of the wedge slightly overlap the lugs 13 of the casing, thereby blocking the wedge against rotation during further downward movement of the same with the shoes. As the forcing in of the shoes is continued, the lugs 15 pass inwardly beyond the lugs 13 of the casing, as illustrated in full lines in Figure 7, freeing the wedge for rotation and permitting the lugs 15 to slide downwardly on the cooperating inclined faces 22 of the shoes, due to the weight of the wedge block and effecting turning of the wedge block in contraclockwise direction, thereby engaging the lugs 15 in back of the lugs 13. As will be evident, a slight turning force may be manually applied to the wedge at this time to speed up this operation. As soon as the lugs 15 are properly positioned in back of the lugs 13, that is, in registration with the latter, the depressing force is removed from the shoes, freeing the latter so that the spring means D forces the shoes to their outermost position, as shown in Figure 1, thereby locking the wedge against rotation, the lugs 15—15—15 of the wedge being confined against rotary movement between adjacent shoes and held in alignment with the lugs 13—13—13 of the casing to engage the latter and lock the wedge block against outward movement.

The operation of my improved shock absorbing mechanism, upon inward movement of the wedge with respect to the casing being produced, due to compression of the mechanism, is as follows: The spring resisted friction shoes are wedged apart and carried inwardly of the mechanism, compressing the spring resistance means D, thus producing high frictional resistance between the friction surfaces of the shoes and casing. Upon the actuating force being reduced, the expansive action of the spring means returns all of the parts to the normal position shown in Figure 1, the wedge block B being limited in its outward movement by engagement of the lugs 15 thereof with the lugs 13 of the casing and the shoes being, in turn, limited in their outward movement by the wedge.

I claim:

1. In a friction shock absorbing mechanism, the combination with a friction casing open at the front end, said casing having three interior friction surfaces, said casing having three inturned retaining lugs at the open end thereof, said lugs being disposed respectively between adjacent friction surfaces; of three shoes respectively engaging the friction surfaces of the casing, said shoes having wedge faces on their inner sides; a wedge block having three retaining lugs extending between adjacent friction shoes and engaging the lugs of the casing to limit outward movement of the wedge block, said wedge block and shoes having cooperating wedge faces, said shoes having their front ends beveled on one corresponding side of each shoe, and each lug of the wedge having its rear face beveled on an inclination corresponding to the bevel of the corresponding shoe to provide clearance for said lugs of the wedge block when the wedge block is rotated to an extent to clear the lugs of the casing; and spring means within the casing opposing inward movement of the shoes.

2. In a friction shock absorbing mechanism, the combination with a friction casing open at the front end, said casing having longitudinally extending, interior friction surfaces at said front end, said casing having inturned retaining lugs at said front end alternated with said friction surfaces; of a plurality of friction shoes cooperating with said friction surfaces; a wedge block between said shoes having wedging engagement therewith, said wedge block having radially, outwardly extending, retaining lugs extending between adjacent shoes and engaging with the lugs of the casing to limit outward movement of the wedge block, each shoe being cut away at its outer end to provide a laterally extending, forwardly inclined guide face, said cut away portions being on corresponding sides of the shoes, said retaining lugs of the wedge having the rear ends cut away correspondingly to said shoes to provide cooperating guide faces engageable with said inclined guide faces of the shoes, said cooperating cut away portions of the lugs of the wedge block and cut away portions of the shoes providing clearance for the lugs of the wedge block in assembling the wedge with the other parts of the mechanism when the shoes are displaced inwardly of the casing to a predetermined extent, and guiding the lugs of the wedge block in back of the lugs of the casing when the wedge is rotatably displaced; and means within the casing yieldingly opposing inward movement of the shoes.

3. In a friction shock absorbing mechanism, the combination with a friction casing open at one end and closed by an imperforate wall at the other end, said casing having a plurality of interior friction surfaces at said open end, and a plurality of retaining lugs, said lugs being disposed respectively between adjacent friction surfaces; of a plurality of friction shoes respectively engaging said friction surfaces, said shoes having wedge faces on the inner sides of V-shaped transverse cross section; a wedge block having a plurality of retaining lugs engaging with the lugs of the casing to limit outward movement of the wedge block, said wedge block having V-shaped wedge faces interengaged with the V-shaped wedge faces of said shoes, said shoes having their side edges cut away at one corresponding side of each shoe to provide clearance for the corresponding lugs of the wedge block to clear the lugs of the casing when the wedge is rotated in assembling the mechanism; and spring means within the casing opposing inward movement of the shoes.

4. In a friction shock absorbing mechanism, the combination with a friction casing open at the front end and closed by an imperforate wall at the rear end, said casing having longitudinally extending, interior friction surfaces at said front end, said casing having inturned retaining lugs at said front end alternated with said friction surfaces; of a plurality of friction shoes cooperating with said friction surfaces, said shoes corresponding in number to said friction surfaces of the casing; a wedge block between said shoes having wedging engagement therewith, said wedge block having radially outwardly extending retaining lugs extending between adjacent shoes and engaging with the lugs of the casing to limit outward movement of the wedge block, each shoe being cut away at one side at the forward end thereof, said cut away portions of the shoes providing clearance for the lugs of said wedge block in assembling the wedge with the other parts of the mechanism when said shoes are displaced inwardly to a predetermined extent and said wedge is rotatably displaced to bring said lugs in alignment with said cut away portions of the shoes and clear the lugs of the casing; and inner and outer coil springs within the casing yieldingly opposing inward movement of the shoes.

5. In a friction shock absorbing mechanism, the combination with a friction casing open at one end, said casing having circumferentially spaced, inwardly projecting lugs at said open end; of a friction clutch cooperating with said casing; and spring means opposing inward movement of the clutch, said clutch including a wedge block and friction shoes surrounding said block, said wedge block and shoes having interengaging wedge faces of V-shaped transverse section, and said shoes and casing having interengaging friction surfaces of V-shaped transverse section, said block having radial lugs engageable in back of the lugs of the casing to limit outward movement of the block, said wedge block being rotatable in assembling the mechanism to engage the lugs thereof in back of the lugs of the casing, the outer ends of said shoes and the inner ends of said lugs having cooperating, inclined faces for guiding the lugs of the wedge in the operation of assembling the wedge with the casing.

6. In a friction shock absorbing mechanism, the combination with a friction casing open at the front end, said casing having three interior friction surfaces of V-shaped transverse section, said casing having three inturned retaining lugs at the open end thereof, said lugs being disposed respectively between adjacent friction surfaces; of three friction shoes having friction surfaces of V-shaped transverse section respectively engaging the friction surfaces of the casing, said shoes having wedge faces of V-shaped transverse cross section on their inner sides; a wedge block having three retaining lugs extending between adjacent friction shoes and engaging the lugs of the casing to limit outward movement of the wedge block, said wedge block having wedge faces of V-shaped transverse cross section engaged with the V-shaped wedge faces of the shoes, said shoes having their front ends beveled on one corresponding side of each shoe, and each lug of the wedge having its rear face beveled on an inclination corresponding to the bevel of the corresponding shoe to provide clearance for said lugs of the wedge block when the wedge block is rotated to an extent to clear the lugs of the casing; and spring means within the casing opposing inward movement of the shoes.

7. In a friction shock absorbing mechanism, the combination with a friction casing open at the front end, said casing having longitudinally extending, interior friction surfaces of V-shaped transverse cross section at said front end, said casing having inturned retaining lugs at said front end alternated with the friction surfaces; of a plurality of friction shoes having friction surfaces of V-shaped transverse cross section engaging the V-shaped friction surfaces of the casing; a wedge block between said shoes, said wedge block and shoes having interengaging wedge faces of V-shaped transverse section, said wedge block having radially outwardly extending retaining lugs extending between adjacent shoes and engaging the lugs of the casing to limit outward movement of the wedge block, each shoe being cut away at its outer end to provide a laterally extending, forwardly inclined guide face, said cut away portions being on corresponding sides of the shoes, said retaining lugs of the wedge block having the rear ends cut away correspondingly to said shoes to provide cooperating guide faces engageable with said inclined guide faces of the shoes, said cooperating cut away portions of the lugs of the wedge block and cut away portions of the shoes providing clearance for the lugs of the wedge block in assembling the wedge with the other parts of the mechanism when the shoes are displaced inwardly of the casing to a predetermined extent, and guiding the lugs of the wedge block in back of the lugs of the casing when the wedge is rotatably displaced; and means within the casing yieldingly opposing inward movement of the shoes.

LEWIS F. GADBOIS.

REFERENCES CITED

The following references are of record in the file of this patent:

UNITED STATES PATENTS

| Number | Name | Date |
| --- | --- | --- |
| 2,411,956 | Dath | Dec. 3, 1946 |